July 24, 1951          M. ROSEAU          2,561,953
ELECTROMECHANICAL POWER TRANSMISSION
Filed Dec. 19, 1946          3 Sheets-Sheet 1
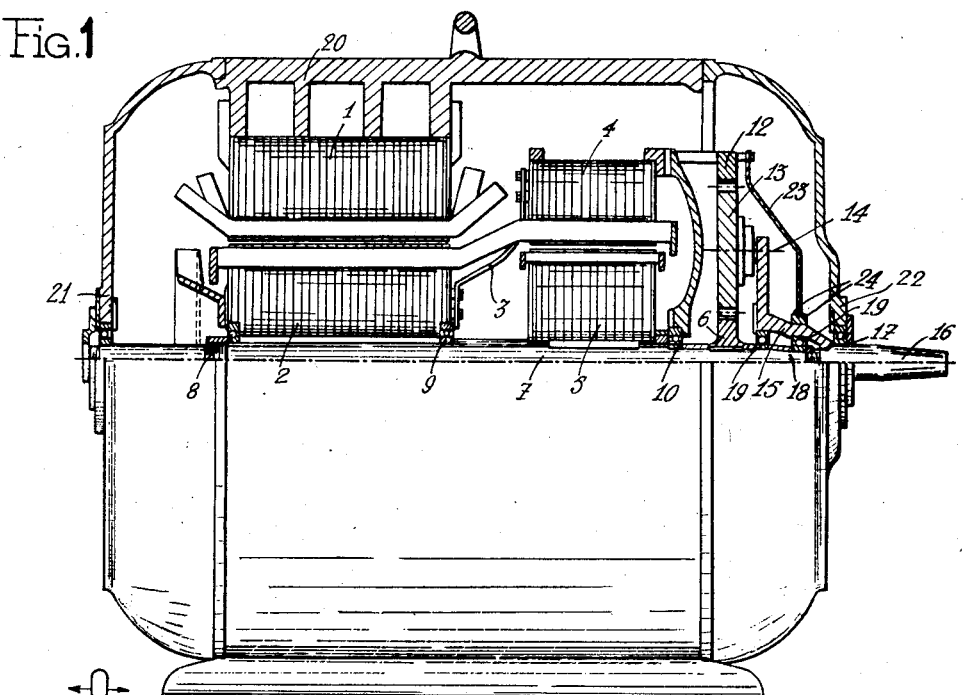
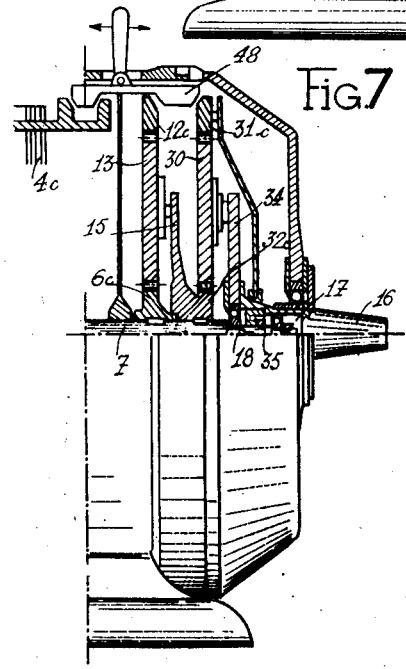
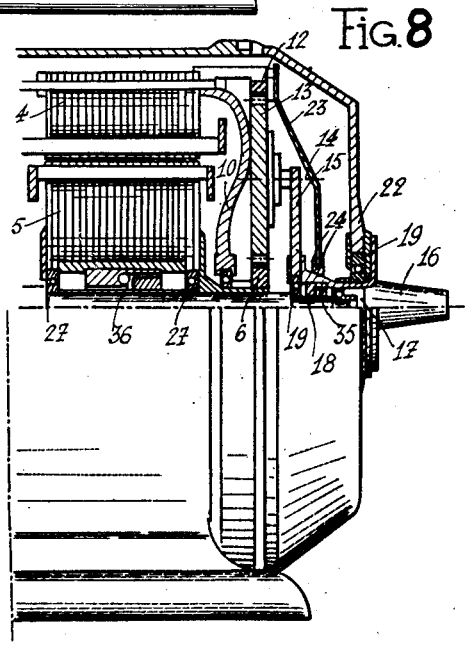
Inventor
Marcel Roseau July 24, 1951  M. ROSEAU  2,561,953
ELECTROMECHANICAL POWER TRANSMISSION
Filed Dec. 19, 1946  3 Sheets-Sheet 3
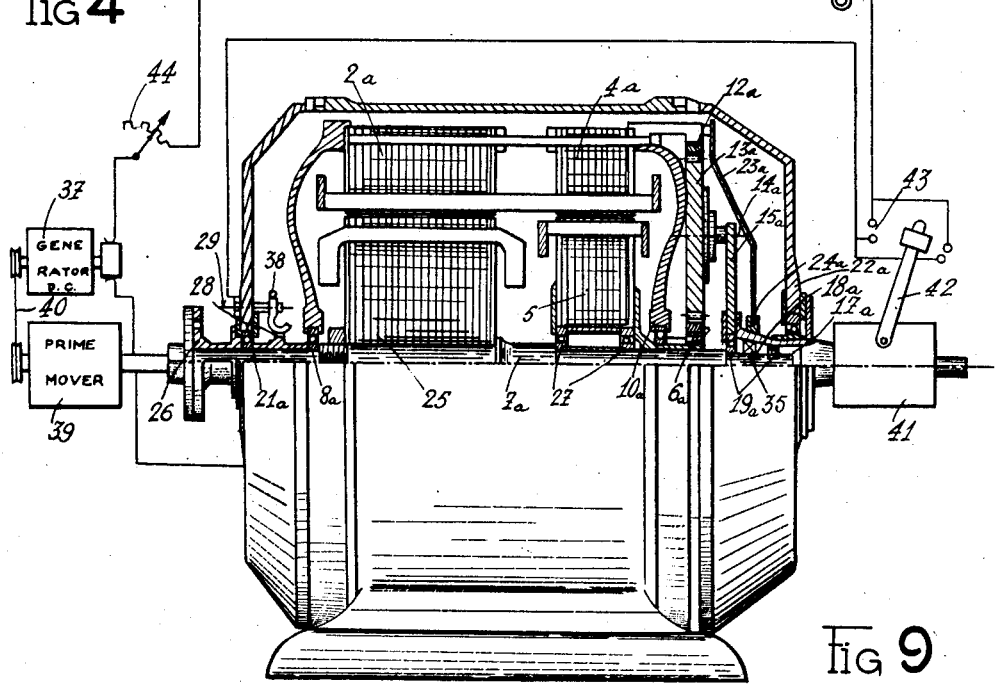
Fig 4
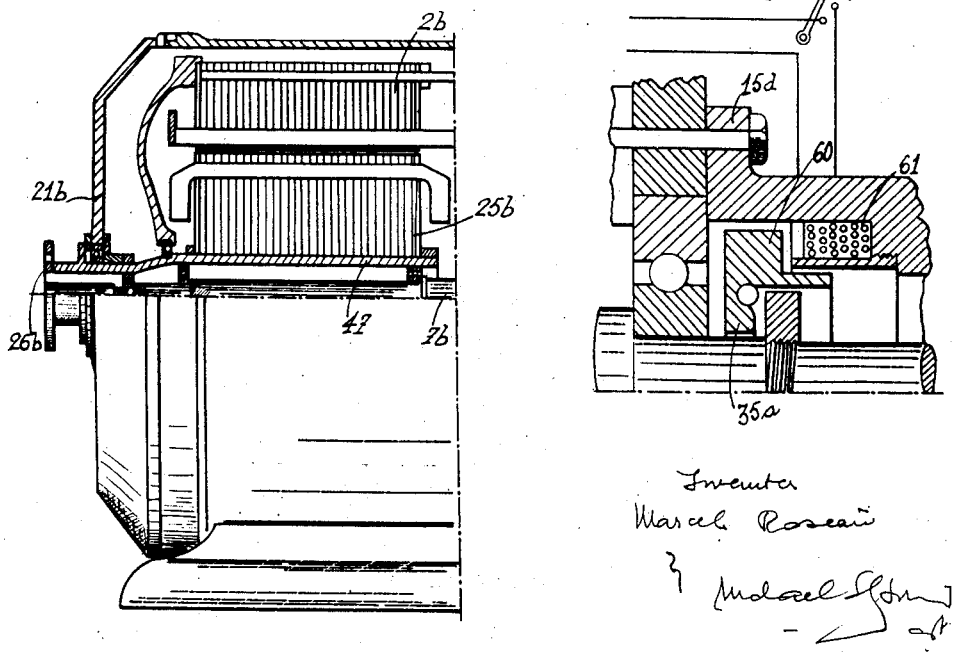
Fig 5
Fig 9
Inventor
Marcel Roseau Patented July 24, 1951

2,561,953

UNITED STATES PATENT OFFICE 2,561,953

ELECTROMECHANICAL POWER TRANSMISSION

Marcel Roseau, Algiers, Algeria

Application December 19, 1946, Serial No. 717,150
In France September 10, 1946

11 Claims. (Cl. 172—284)

The present invention relates to an electromechanical power transmission, in which the speed automatically varies as an inverse function of the variation of the resistance torque.

A transmission in accordance with the invention comprises two rotating field electric motors connected in cascade, i. e., the armature winding of the primary motor being connected in series with the field winding of the secondary motor, said primary armature being mechanically associated with the secondary field magnet, two transmission elements, respectively associated with the field magnet and the armature of the secondary motor, and means for mechanically connecting these transmission elements and associated with the shaft to which the resistance torque is applied.

The rotating field issued from the secondary field winding in series with the primary armature winding is nothing but a field identical with the reaction field opposing, in this armature, with more or less space shift, the initial rotating field created by the primary field winding and turns at the same speed and in the same direction as the latter. The result is that the secondary armature, except for its own small slipping, turns at the same speed and in the same direction as the initial rotating field, driving, at that speed, the transmission element associated therewith. The primary armature and the secondary field magnet, mechanically connected together, rotate together at a different speed, resulting from the slipping of the primary armature inside the initial rotating field, and drive at that different speed the transmission element associated with the secondary field magnet. The above slipping is a direct function of the load applied to the secondary field magnet and of the electrical power required from the corresponding field winding and put out by the primary armature winding. The connecting means of the transmission elements, in turn, transmit to the shaft to which the resistance torque is applied a movement whose speed is the resultant, as a function of the structural characteristics of the transmission elements, of the different speeds at which each of them is driven.

If the initial rotating field has a constant speed and if the resistance torque happens to increase, the mechanical power output of the secondary armature, also with a constant speed, will increase substantially in the same ratio, causing an increase of the electrical power to be delivered by the secondary field winding and a proportional additional slipping of the latter and of the primary armature; there results a decrease of the rotation speed of the assembly "primary armature-secondary field magnet" and of the transmission elements associated therewith. The speed of the shaft to which the resistance torque is applied thus becomes the resultant of the constant speed of a transmission element, and of that of the other transmission element, in decrease with respect to its initial speed. The self variation of the speed of the shaft to which the resistance torque is applied as an inverse function of the variation of said torque is thus obtained.

The invention also concerns means used for the realisation of such transmissions and namely for the creation of the initial rotating field. The latter may be generated electrically, the field magnet of the primary motor being fixed and its field winding supplied with alternating current, or mechanically, the field magnet of the primary motor being driven by a power generator and its field winding supplied with direct current.

It also relates to the applications of said transmission either as a motor for the driving of any machine, in general, and of machines having a highly variable resistance torque in particular, or as an electro-mechanical self regulator for the speed.

The following description, in connection with the appended drawings, given by way of non-limitative examples, will show clearly how the invention can be applied.

On these drawings:

Figure 1 shows schematically, partly in section, a power transmission according to the invention and utilized as a motor;

Figure 4 shows schematically, partly in section, a power transmission according to the invention and utilized as an auto-regulator of speed;

Figure 5 shows schematically, partly in section, an alternative embodiment of the primary motor illustrated in Fig. 4;

Figure 7 shows a second alternative of the mechanical transmission;

Figures 8 and 9 show a special mechanical transmission for the application of the power transmission to automobiles.

Figure 3:
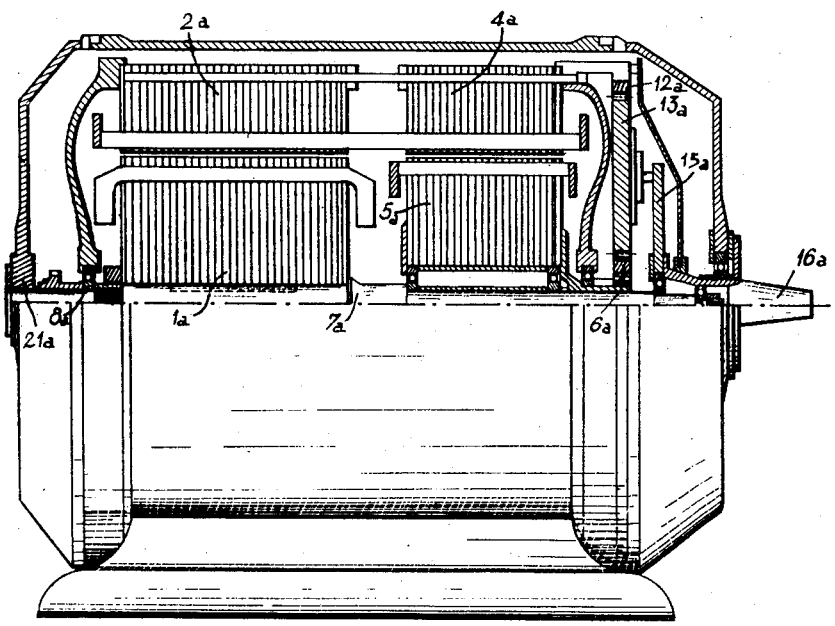
Figure 3 shows schematically, partly in section, an alternative of the power transmission illustrated in Fig. 1.

The transmission according to the invention and acting as a motor, represented on Figure 1, comprises a fixed primary field magnet 1, identical with a normal single or multi-phase stator for an asynchronous motor, a primary squirrel-cage armature 2, mechanically associated, through the connection flange 3, with the secondary field magnet 4 provided with a squirrel-cage which carries the same bars of the same cage as the primary armature 2 and a secondary armature 5 as a double or single squirrel-cage.

The secondary armature 5 is secured, by means of a key, for instance, as well as a small diameter pinion 6, on a primary shaft 7. The assembly armature 2-field magnet 4 is centered on this shaft by ball or roller bearings 8 and 9, and by a flange bearing 10 with balls or rollers: this assembly is associated by any known fixation means, by bolts or nuts, for instance, with a ring gear 12.

Pinion 6 and ring gear 12 are mechanically connected by a set of several planet wheels 13 the stud shafts of which, centered on lines 14 are fixed in any known manner on spider 15. The planet wheels 13 are mounted free on their shafts. The resulting motion is transmitted by the spider 15 which, to this effect, carries a secondary shaft end 16.

Facing this secondary shaft end 16, spider 15 offers an empty space 17 for receiving one of the extremities 18 of the primary shaft 7, which is supported in this empty space by a ball or roller bearing 19. The primary field magnet 1 is mounted inside a normal housing 20 carrying the flange bearings 21 and 22. This housing may rest on the common base plate of the bearings if the latter are separate.

A system of sheet metal flanges 23, associated with field magnet 4, for instance, provided with tight joints 24, acts as an oil guard, avoiding the projections inside the windings, of the oil of the tank in which gears 12 and 13 dip with their lower parts.

In one alternative embodiment (Fig. 3), the primary field magnet 1a may be mounted inside the primary armature 2a and keyed on the primary shaft 7a. The latter is then held fixed in the flange bearing 21a. The armature 5a and the pinion 6a then rotate about the primary shaft 7a. The other arrangements are unchanged.

In the embodiment represented on Figure 4, the transmitting device according to the invention acts as an auto-regulator for the speed. It differs from the embodiment of Figure 3 only by the replacemnt of field winding 1a by a primary rotating field magnet 25 identical with a normal alternator field magnet, driven by the power generator whose speed must be varied in inverse ratio to the resistance torque and excited by a D. C. mains or by a dynamo specially designed therefor. The primary rotating field magnet 25 is keyed on the primary shaft 7a and is driven by the power generator by means of the driving disc 26 keyed on said shaft. The armature 5 carries the pinion 6a and rotates freely with it about the primary shaft 7 on which it is centered by the ball or roller bearings 27. The other elements and their mounting arrangements remain unchanged as compared with the embodiment represented on Figure 3.

The D. C. generator 37, of any type, with a substantially constant voltage for large speed variations feeds, through collar 28 and brush holders, 38, associated with the flange bearing 21a and articulated about the pins 29, the primary rotating field magnet 25. It is preferably fixed on the frame of the power generator 39 itself and coupled to the power generator by means of a gear or of a silent chain 40.

In case the auto-regulator of speed must drive a device in both directions, as its direction of rotation is invariable, a reversing device 41 is provided following the secondary shaft. While passing through the dead point, the lever 42 operating this reversing device is arranged for breaking the excitation current of the primary rotating field winding by means of the switch 43.

In one variant (Fig. 5), the armature 5 and its pinion 6 are keyed directly on the primary shaft 7b. The primary field magnet 25b is then mounted on a sheath 47 carrying the driving disc 26b and inside which the corresponding extremity of the primary shaft 7b can be journaled by means of a mounting similar to the one which holds its other extremity 18 in the empty space 17. It is then the sheath 47 carrying the driving disc which is held by the flange bearing 21b.

Figure 6:
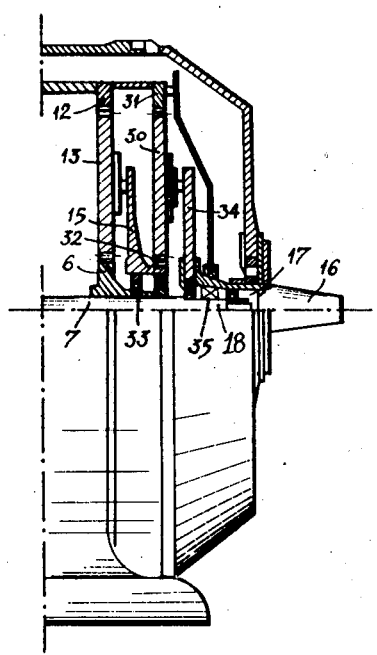
Figure 6 shows a fractional view of an alternative embodiment of the mechanical transmission.
Figure 2:
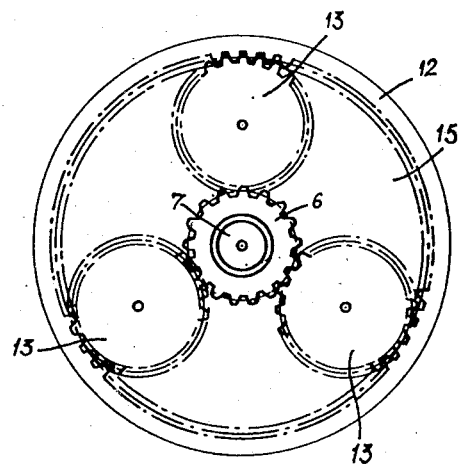
Figure 2 shows schematically a preferred embodiment for the connection means of the two mechanical transmission elements.

In case a single set of planet wheels 13 does not allow a sufficient slipping of the spider 15, its action can be amplified by the addition of a second set 30 (Figure 6), driven parallelly by the ring gear 31, associated with the ring gear 12 and by a pinion 32 carried by the spider 15 which presses on the primary shaft 7 through a ball or roller bearing 33. The planet wheels 30 are mounted free on axles associated with a spider 34 which carries the secondary shaft 16 and in which is provided the empty space 17 used for the guiding of the end 18 of the primary shaft 7.

The slipping of the assembly primary armature 2-secondary field magnet 4, may be modified by using, as represented on Figure 7, two planetary systems with different ratios and arranged in parallel. The ring gears 12c and 31c may, both of them, be free or keyed on the secondary field magnet 4c through dog clutches 48 which are controlled mechanically or electrically. In such a case, pinion 32c, like pinion 6c is keyed on shaft 7.

The slipping may also be modified at will, in the case of the auto-regulator of speed, by varying the excitation of the rotating primary field winding 25, within close limits, however, by means of a rheostat 44 (Fig. 4).

In its realisation as a motor, the transmission device forming an object of the invention may be used, with all the advantages attendant upon the immediate adaptation of the driving torque to the resistance torque, without any jerk on the electrical supply network, for the driving of any machine, generally, and more especially of those which have a highly variable resistant torque, such as pumps, compressors, mixers, hoisting apparatus, machine tools, winches, elevators, extracting machines, rolling machines, ploughing machines, various agricultural machines, etc. Starting is effected by the simple closure of the supply switch.

As an electro-mechanical auto-regulator of speed the transmission device forming an object of the invention can be used, particularly as a coupling device between any power generator and a machine or an apparatus with a highly variable resistant torque driven by it, machines or apparatus of the kind mentioned above, and more particularly as an automatic continuous speed changing device for any vehicles or self propelling devices on road or rail.

In this latter application, one or two free wheel mechanisms 35 and 36 (Figure 8), are designed for acting as soon as the vehicle drives the transmission. Mechanism 36, automatically operated, connects the motor of the vehicle directly to secondary shaft 16. Mechanism 35 connects them with the demultiplication of the planetary system by blocking ring gear 12a, (Figure 4) or one or the other of ring gears 12 or 31, (Figure 6) on the frame of the apparatus; this blocking is effected by a mechanically operated brake, for instance, and used for long and steep down slopes.

Furthermore, in the application of the transmission to automobile vehicles (Fig. 4), a second switch 45 mounted in series with the switch 43 controlled by the reversing device 42 is operated by the normal clutch pedal 46. It is even possible, in this application, to do away with the normal mechanical clutch, the motor being coupled directly to the driving disc 26; the free wheel device 35a (Fig. 9) then has its outside housing 60 free or locked on spider 15d according to whether the clutch pedal 46a is in the disconnecting position, (excitation of the rotating field 25 deenergized) or in the connecting position, (rotating field 25 energized). This second locking may be effected by the clutch pedal 46a mechanically or electrically as illustrated in Fig. 9 by means of an electro-magnet 61 by example.

What is claimed is:

1. In a rotating electro-mechanical power-transmitting device, in combination, a primary element comprising a primary field magnet having a primary field winding thereon and a primary armature having a primary armature winding thereon; a secondary element being separate from said primary element and comprising a secondary field magnet having a secondary field winding thereon and a secondary armature having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; and a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque.

2. In a rotating electro-mechanical power-transmitting device, in combination, a primary shaft; a primary element comprising a primary field magnet having a primary field winding thereon and a primary armature having a primary armature winding thereon and being loosely mounted on said primary shaft; a secondary element being separate from said primary element and comprising a secondary field magnet having a secondary field winding thereon and being loosely mounted on said primary shaft and a secondary armature rigidly connected to said primary shaft and having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; and a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque.

3. In a rotating electro-mechanical power-transmitting device, in combination, a primary shaft; a primary element comprising a stationary primary field magnet having a primary field winding thereon and a primary armature having a primary armature winding thereon and being loosely mounted on said primary shaft; a secondary element being separate from said primary element and comprising a secondary field magnet having a secondary field winding thereon and being loosely mounted on said primary shaft and a secondary armature rigidly connected to said primary shaft and having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; and a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque.

4. In a rotating electro-mechanical power-transmitting device in combination, a prime mover; a primary shaft driven by said prime mover; a D. C. generator associated with said prime mover; a primary element comprising a primary field magnet rigidly connected to said primary shaft so as to be in driven relationship with said prime mover; a primary field magnet winding arranged on said primary field magnet and supplied with current by said D. C. generator; a primary armature having a primary armature winding thereon, said primary armature forming part of said primary element; a secondary element being separate from said primary element and comprising a secondary field magnet having a secondary field winding thereon and being loosely mounted on said primary shaft and a secondary armature rigidly connected to said primary shaft and having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; and a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque.

5. A device as claimed in claim 4 and a rheostat inserted between said D. C. generator and said primary field magnet winding for varying the supply of direct current to said primary field magnet winding, whereby the slipping of said field magnet may be arbitrarily adjusted.

6. In a rotating electro-mechanical power-transmitting device in combination, a prime mover; a primary shaft driven by said prime mover, a D. C. generator associated with said prime mover; a primary element comprising a primary field magnet rigidly connected to said primary shaft so as to be in driven relationship with said prime mover; a primary field magnet winding arranged on said primary field magnet and supplied with current by said D. C. generator; a primary armature having a primary armature winding thereon, said primary armature forming part of said primary element; a secondary element being separate from said primary element and comprising a secondary field magnet having a secondary field winding thereon and being loosely mounted on said primary shaft and a secondary armature rigidly connected to said primary shaft and having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque; and a reversing device connected to said output shaft and including a control member and a switch inserted between said D. C. generator and said primary field magnet and associated with said control member for interrupting the excitation current of said primary field magnet winding when said control member passes through the dead point thereof.

7. In a rotating electro-mechanical power-transmitting device in combination, a prime mover; a primary shaft driven by said prime mover; a D. C. generator associated with said prime mover; a rotatable sheath surrounding a part of said primary shaft and being driven by said prime mover; a primary element comprising a primary field magnet rigidly connected to said sheath so as to be in driven relationship with said prime mover; a primary field magnet winding arranged on said primary field magnet and supplied with current by said D. C. generator; a primary armature having a primary armature winding thereon, said primary armature surrounding said primary field magnet and forming part of said primary element; a secondary element being separate from said primary element and comprising a secondary field magnet having a secondary field winding thereon and being loosely mounted on said primary shaft and a secondary armature rigidly connected to said primary shaft and having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; and a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque.

8. In a rotating electro-mechanical power-transmitting device, in combination, a primary element comprising a primary field magnet having a primary field winding thereon and a primary armature having a primary armature winding thereon; a secondary element being separate from said primary element and comprising a secondary field magnet having a secondary field winding thereon and a secondary armature having a secondary armature winding thereon arranged outside of the field produced by said primary field winding; a rigid mechanical connection between said primary armature and said secondary field magnet and an electrical series connection between said primary armature winding and said secondary field winding; an epicyclic gear including a plurality of sets each including a sun wheel and an orbital gear, said orbital gears being independent of one another, said sun wheels being connected to said secondary armature; a group of planet wheels associated with each of said sets, respectively; a dog-clutch device including clutches, the number of said clutches being equal to the number of said sets, for independently connecting each of said orbital gears with said secondary field magnet; an output shaft; and a spider for each of said sets rotatably supporting said planet wheels thereof, one of said spiders being fitted on said output shaft, the others of said spiders of said sets being secured, respectively, to said sun gear of the preceding set, whereby for a constant power output, when one of said clutch devices drives said orbital gear of said corresponding set, the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said spider corresponding to said clutched orbital gear so that the rotary speed of said output shaft automatically varies as a reverse function of the variation of the resistance torque, the amplitude of the variation depending on said set having said orbital gear thereof clutched.

9. In a rotating electro-mechanical power-transmitting device for automobile vehicles having an engine, in combination, a D. C. generator associated with the engine; a primary rotatable shaft driven by the engine; a primary element comprising a primary field magnet rigidly connected to said primary shaft; a primary field magnet winding arranged on said primary field magnet and supplied with current by said D. C. generator; a primary armature having a primary armature winding thereon and being loosely mounted on said primary shaft; a secondary element being separate from said primary element and comprising a secondary field magnet having a secondary field winding thereon and being loosely mounted on said primary shaft and a secondary armature rigidly connected to said primary shaft and having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque; and a reversing device secured on said output shaft including a control member and two switches inserted in series between said D. C. generator and said primary field magnet and associated, respectively, with said control member and the clutch pedal of the vehicle for interrupting the excitation current of said primary field magnet winding when said control member passes through the dead point and when the pedal is in de-clutching position.

10. In a rotating electro-mechanical power-transmitting device for automobile vehicles having an engine, in combination, a D. C. generator associated with the engine; a primary rotatable shaft driven by the engine; a primary element comprising a primary field magnet rigidly connected to said primary shaft; a primary field magnet winding arranged on said D. C. generator; a primary armature having a primary armature winding thereon and being loosely mounted on said primary shaft; a secondary element being separate from said primary element and comprising a secondary field magnet having a secondary field winding thereon and being loosely mounted on said primary shaft and a secondary armature rigidly connected to said primary shaft and having a secondary armature winding thereon arranged outside of the field produced by said primary field winding; a rigid mechanical connection between said primary armature and said secondary field magnet and an electrical series connection between said primary armature winding and said secondary field winding; a first transmission element rigidly connected to said secondary armature; a second transmission element rigidly connected to said primary armature and said secondary field magnet rigidly connected thereto; an output shaft; a third transmission element rigidly connected to said output shaft, said third transmission element connecting said first and second transmission elements with each other whereby for a constant power output the power of said secondary element varies directly as the resistance torque applied to said output shaft, thus inducing a variation in one direction of the slipping of said primary armature with respect to said primary field magnet and therefore a variation in reverse direction of the rotary speed of said primary armature and said third transmission element so that the rotary speed of said output shaft automatically varies as a reverse function of the variation of the resistance torque; a first free wheel mechanism located between said primary shaft and said secondary armature; a second free wheel mechanism located between said output shaft and said third transmission element; and means for actuating said second free wheel mechanism.

11. A device as claimed in claim 10, said second free wheel mechanism having an outer housing loosely mounted with respect to said third transmission element and having means controlled by a clutch pedal for hooking said outer housing with said third transmission element.

MARCEL ROSEAU.

REFERENCES CITED

The following references are of record in the file of this patent:

UNITED STATES PATENTS

| Number | Name | Date |
|---|---|---|
| 1,552,155 | Hawley | Sept. 1, 1925 |
| 1,630,201 | Metcalfe | May 24, 1927 |
| 1,893,346 | Winther et al. | Jan. 3, 1933 |
| 2,208,385 | Murray | July 16, 1940 |
| 2,436,936 | Page | Mar. 2, 1948 |

FOREIGN PATENTS

| Number | Country | Date |
|---|---|---|
| 18,954 | Great Britain | of 1913 |
| 503,925 | France | Mar. 27, 1920 |
| 638,467 | France | Feb. 21, 1928 |